United States Patent [19]

Christensen

[11] Patent Number: 5,404,668
[45] Date of Patent: * Apr. 11, 1995

[54] FISHING FLOAT

[76] Inventor: Everett B. Christensen, 605 2nd St. NE, Dilworth, Minn. 56529

[ * ] Notice: The portion of the term of this patent subsequent to Sep. 14, 2010 has been disclaimed.

[21] Appl. No.: 121,364

[22] Filed: Sep. 13, 1993

Related U.S. Application Data

[63] Continuation-in-part of Ser. No. 880,561, May 8, 1992, Pat. No. 5,243,780.

[51] Int. Cl.$^6$ .............................................. A01K 93/00
[52] U.S. Cl. ..................................................... 43/44.87
[58] Field of Search ................... 43/4, 4.5, 44.91, 44.9, 43/44.87, 43.1

[56] References Cited

U.S. PATENT DOCUMENTS

| | | | |
|---|---|---|---|
| 2,153,339 | 4/1939 | Reeves et al. | 43/44.91 |
| 2,263,743 | 11/1941 | Shope | 43/46 |
| 2,481,346 | 9/1949 | Rigby | 43/49 |
| 2,931,124 | 4/1960 | Johnston | 43/44.9 |
| 3,084,467 | 4/1963 | Bromwell | 43/19 |
| 3,292,296 | 12/1966 | Viveiros | 43/19 |
| 3,323,247 | 6/1967 | Murray | 43/17 |
| 3,667,149 | 6/1972 | Daigle | 43/44.91 |
| 3,918,193 | 11/1975 | Schneider | 43/43.1 |
| 4,785,568 | 11/1988 | Wang | 43/19 |
| 4,856,792 | 8/1989 | Hardison | 273/416 |
| 5,241,774 | 9/1993 | Rayburn | 43/44.9 |
| 5,243,780 | 9/1993 | Christensen | 43/44.87 |

FOREIGN PATENT DOCUMENTS

179363  1/1936  France .

*Primary Examiner*—P. Austin Bradley
*Assistant Examiner*—Jeanne M. Elpel
*Attorney, Agent, or Firm*—Merchant, Gould, Smith, Edell, Welter & Schmidt

[57] ABSTRACT

A fishing float having three or more vanes extending radially from a longitudinal axis. The vanes provide the floatation section with a large profile relative to the cross-sectional area of the float. The vanes can be selectively detached from the center stem of the float.

18 Claims, 5 Drawing Sheets

FIG.9

FISHING FLOAT

RELATED CASES

This is a continuation-in-part of U.S. patent application Ser. No. 07/880,561, filed May 8, 1992, (now issued as U.S. Pat. No. 5,243,780).

FIELD OF THE INVENTION

This invention relates to the field of fishing floats or bobbers. More particularly, the present invention comprises a fishing float having a plurality of individual vanes extending radially from its center.

BACKGROUND OF THE INVENTION

Fishing floats are commonly used in fishing to suspend bait, such as minnows or worms, above the bottom of a body of water. They also allow a fisherperson to monitor whether a fish is taking the bait. Early fishing floats were designed primarily for floatation and monitoring, with little consideration given to casting or the resistance the bobbers offered to fish taking the bait suspended below the bobber. Such floats are typically spherical and house an inner compartment of air to provide the floatation necessary for the float to work correctly. The monitoring function worked effectively based on the size of the bobber which increased its profile for monitoring by the fisherperson. As a result, when small floats were used to decrease resistance presented to fish, the fisherperson had to contend with an accompanying decrease in visibility.

Known floats also present problems when retrieved by the fisherperson. The resistance offered by such floats is often mistaken as an indication that a fish has been hooked. Instead, the resistance felt is often that of the bobber moving through the water. That resistance results in the retrieval of bait that could best be left in the water.

Another problem associated with known fishing floats is the volume needed to store the floats in a tackle box.

An adaptation which attempted to address the problem of resistance to fish taking the suspended bait is known as a pencil bobber. Such bobbers presented a smaller cross section than a typical spherical float and were, therefore, less resistant to moving through water. Pencil bobbers typically have an elliptical or round shaped float section topped by a thin protrusion to offer increased visibility for the fisherperson. In spite of the thin protrusion, however, pencil bobbers are typically less visible to the fisherperson based primarily on the narrow profile they present for monitoring.

Pencil bobbers also do not address the problem of casting fishing lines with floats attached for buoyancy. Casting is particularly difficult when windy conditions are encountered.

SUMMARY OF THE INVENTION

The present invention provides an improved fishing float which addresses the problems associated with known fishing floats. In addition, the fishing float of the present invention offers advantages over those devices.

The present invention provides a float which retains high visibility for the fisherperson, similar to the spherical bobber. It does so without suffering from the related problem of increased resistance to fish taking bait suspending below the fishing float.

The present invention overcomes the problems associated with the prior art by employing a plurality of buoyant vanes extending radially from the center of the float. That design provides a wide profile to the fisherperson monitoring the float while providing a reduced cross-sectional area when the bobber is viewed from the end—resulting in lowered resistance to movement to water.

That lowered resistance is also useful when a fisherperson is retrieving the bait, as the lack of resistance offered by the float of the present invention allows the fisherperson to determine whether is fish has been hooked. The fisherperson will quickly determine that information at the start of reeling the line in and, therefore, have the opportunity to stop reeling and allow the bait to remain in the water.

For the same reasons, the present invention also offers dramatic improvements in the casting of fishing lines with floats manufactured according to the present invention attached. The vanes of the present invention take advantage of the aerodynamics of an arrow, improving both casting distance and accuracy in calm or windy conditions (which can seriously impair the castability of conventional fishing floats).

When cast side-arm style from the right, the present invention does, in fact, allow the fisherperson to cast the line in a curve with the bobber tending to travel from right to left. When the float is cast side-arm style from the left side of the fisherperson, the line tends to travel from left to right. This feature of the present invention allows the fisherperson to more accurately place bait and in some instances, to cast around objects such as docks, pillars, trees or boulders.

The present invention also addresses the problem of limited storage space in tackle boxes. The vanes or wings of the float can be detached from the stem to allow more efficient storage of the float when not in use. When disassembled, the floats of the present invention can be easily stored in the trays found in most tackle boxes without breakage or damage that would occur to existing bobbers. An additional advantage of such a system is the ability to customize the vanes both in color and shape to suit prevailing weather conditions as well as personal taste.

Another advantage of the present invention is its ability to be adapted for night use. The present invention includes an attachment on top of the float which can accept a luminescent stick containing a chemical material which, when activated, provides light which can be used to monitor the float during night fishing.

The visibility of the float of the present invention can also be increased by adding sections on top of the float using the same attachment used to attach the light sticks. These additional sections can essentially be additional floats according to the present invention. The additional sections increase the profile of the float for monitoring by the fisherperson. This feature is particularly useful in ice fishing as an extension of suitable length can be added on top of the float so that it extends above the level of the ice in the ice fishing hole. In that configuration, the fisherperson can monitor the status of the bobber without having to peer directly into the ice fishing hole. Also, the resilient nature of the preferred attachment means prevents breakage when the float is pulled through the ice fishing hole after a fish has been hooked.

The line retention systems of the present invention also offer advantages. In one embodiment, the flexible resilient tube allows the float to be easily converted for use as a slip bobber or a stationary bobber. In the slip mode, the resilient tube is fitted over the bottom end of the float only far enough to retain the line within the slot, leaving adequate room for line to travel freely through the open area of the slot. In the stationary mode, the tube is fitted over the bottom end of the float to securely clamp the line between the tube and the center stem where it runs through the slot.

The tube used to retain the float on a fishing line is also advantageously used to attach a weight on the bottom of the float. The weight provides additional casting accuracy and distance as well as keeping the float upright when in use.

Therefore, in accordance with one aspect of the invention, there is provided a float device for fishing which includes a first section including a center stem having first and second ends and a longitudinal axis lying between said first and second ends; line retention means, coupled to said first section, for holding a fishing line; and a float section attached to said center stem, said float section having three or more fixed vanes extending radially therefrom and extending substantially along a portion of the longitudinal axis of said center stem, said vanes having positive buoyancy in water sufficient to impart positive buoyancy in water to said float device.

In accordance with another aspect of the invention, there is provided a float device for fishing which includes a first section including a center stem having first and second ends and a longitudinal axis lying between said first and second ends; line retention means, coupled to said first section, for holding a fishing line; and a float section attached to said center stem, said float section having three or more vanes extending radially from a longitudinal axis of said float section, said vanes having positive buoyancy in water sufficient to impart positive buoyancy in water to said float device. The line retention means includes a slot formed proximate the second end of said center stem, said slot formed along the length of said center stem, and retaining means fitted over said slot and said second end, said slot and retaining means cooperating to retain a fishing line within said slot.

In accordance with a further aspect of the invention, there is provided a float device for fishing which includes a first section including a center stem having first and second ends and a longitudinal axis lying between said first and second ends; line retention means, coupled to said first section, for holding a fishing line; and a float section attached to said center stem, said float section having three or more vanes extending radially from a longitudinal axis of said float section, said vanes having positive buoyancy in water sufficient to impart positive buoyancy in water to said float device, wherein said float section is a completely integral unitary section.

In accordance with another aspect of the invention, there is provided a float device for fishing which includes a first section including a center stem having first and second ends and a longitudinal axis lying between said first and second ends; line retention means, coupled to said first section, for holding a fishing line; a weight attached to said first section proximate said second end of said center stem; and a float section attached to said center stem proximate said first end of said center stem, said float section having three or more vanes extending radially from a longitudinal axis of said float section, said vanes having positive buoyancy in water sufficient to impart positive buoyancy in water to said float device.

DETAILED DESCRIPTION OF THE INVENTION

Preferred and alternate embodiments of the present invention are described in detail below. The present invention is, however, described most completely in the claims appended hereto.

Figure 1:
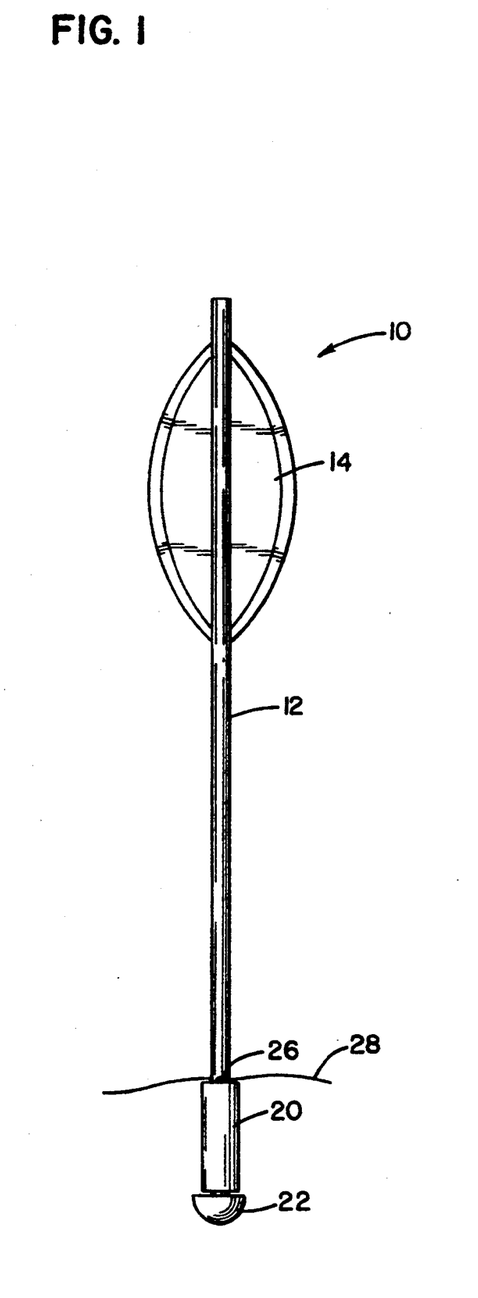
FIG. 1 is a side view of the preferred embodiment of the present invention.
Figure 2:
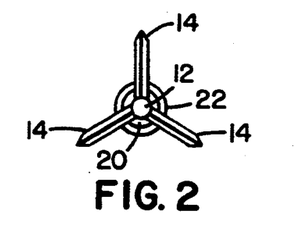
FIG. 2 is a top view of the preferred embodiment of the present invention.
Figure 6:
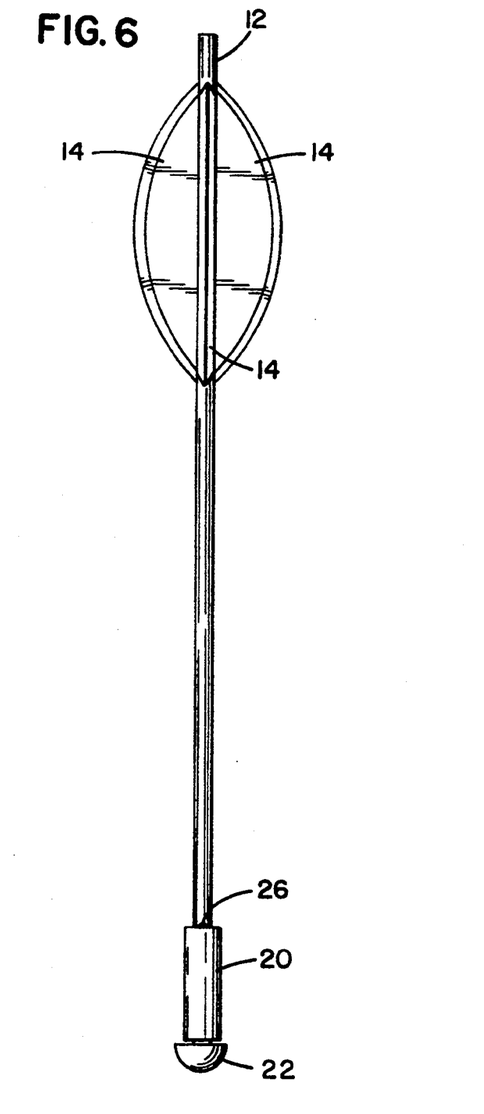
FIG. 6 is a side view of the preferred embodiment of the present invention.
Figure 6A:
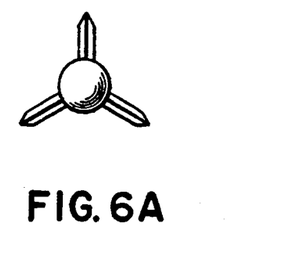
FIG. 6A is an end view of the preferred embodiment taken from the bottom of the float.

FIGS. 1 and 6 are side views of one embodiment of the present invention. As shown there, the float 10 includes a center stem 12 with vanes 14 extending radially from the float. As a result, the side profile of the float 10 remains large in relation to the cross-section of the float as shown in FIG. 2.

In the preferred embodiment, the vanes 14 are permanently attached to center stem 12. It will be understood, however, that the vanes 14 could be detachable from stem 12 to reduce the volume necessary to store the float 10 in a tackle box. Such construction would also allow fisherpersons to customize the float for prevailing conditions or to suit personal tastes.

In the preferred embodiments, the vanes 14 are preferably spaced equally about the center stem 12. As a result, when three vanes 14 are used the angle between adjacent vanes would be 120°. If four vanes are used, the angle between adjacent vanes 14 would be 90°.

Although the vanes 14 have a substantially elliptical shape when viewed from the side, it will be understood that the shape of the vanes is secondary and they could take a number of shapes as desired by the manufacturer. The primary benefit of the vanes 14 is shown best in FIG. 2 where it is shown that they extend radially from the center stem 12. As can be seen there, vanes 14 of any shape would provide a similar cross section when viewed from the end and, thereby, provide the advantages discussed above.

Figure 1A:
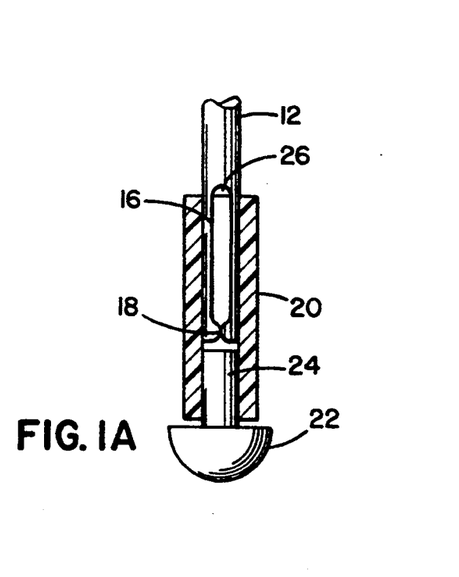
FIG. 1A is a partial cross section of the line retention area of the preferred embodiment of the present invention.

FIG. 1A is a partial cross-sectional view of the line retention area at the bottom end of the present invention. As shown there, the embodiment contemplates the use of a section of flexible silicone tubing 20 fitted over the end of center stem 12. Center stem 12 has a slot 16 formed in its bottom end. The slot 16 is formed to accept a fishing line 28 (as shown in FIG. 1).

Spacer bumps 18 are preferably molded into the ends of center stem 12 to maintain slot 16 in its open position against the compression of the tube 20. When attaching a line to the float, the spacer bumps move away from each other, allowing the line 28 to pass into slot 16.

The slot 16 is aligned with one of the three vanes 14 which results in the slot 16 also bisecting the angle formed by the other two vanes 14. It has been determined that such a configuration offers the greatest accuracy and most predictable performance in casting the float 10 (as described above).

It is because of the silicone tubing 20 that float 10 can be adapted for either slip or stationary use. FIG. 1A depicts the float in a configuration for slip use as a line 28 can be fitted through aperture 26 remaining in slot 16 of the float 10. Sliding the silicone tubing 20 up the center stem 12 of the float would securely clamp line 28 between the tube 20 and center stem 12 where it passes through slot 16. That would convert the float 10 to a stationary float which would not slide along line 28.

Also shown in FIG. 1A is weight 22 which is fitted at least partially within tubing 20 using protrusion 24. Weight 22 provides both additional casting range and accuracy as well as keeping the float 10 upright during use. The end section 22 of the weight is preferably blunt to prevent it from penetrating any objects which it may strike.

Although the use of silicone tubing is preferred, those skilled in the art will recognize that other methods and apparatus for attaching fishing line to the float could be used. In addition, the design of the preferred line retention means could be used with objects other that silicone tubing, such as tubing formed of other materials or a resilient spring (as is common with pencil bobbers).

Figure 3:
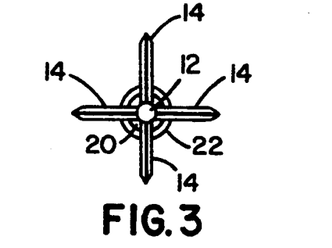
FIG. 3 is a top view of an alternate embodiment of the present invention.

FIG. 3 is a top view of an alternate embodiment of the present invention in which four vanes 14 are attached to center stem 12. It will be understood that any number of vanes 14 could be used provided they collectively do not provide a cross-sectional area which would reduce the casting benefits and low resistance to pull through water of the present invention. The preferred number of vanes 14 is three because the float 10 then provides substantially the same profile when viewed from any angle, while minimizing the cross-section of the float 10 when viewed from the ends.

Alignment of the slot for the line retention system in a float with four vanes also affects casting accuracy (as for the preferred three vaned version). If the float is provided with four vanes 14 as shown in FIG. 3, the slot is preferably aligned so that it bisects opposing angles formed by the vanes. In other words, if the four vanes were seen as forming an "X", the slot would cut the "X" in half.

Figure 4:
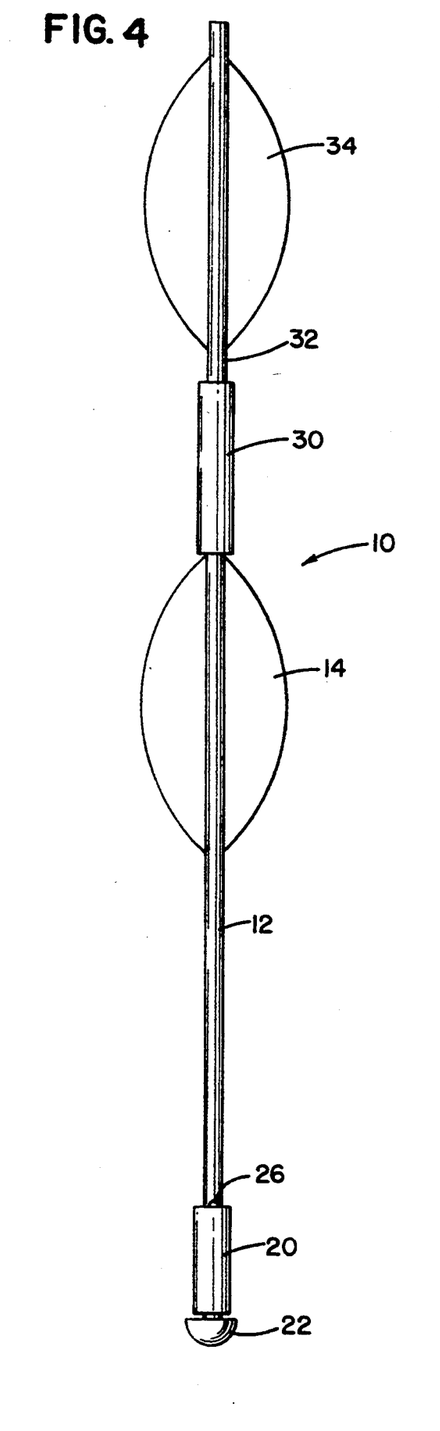
FIG. 4 is a side view of an alternate embodiment of the present invention.

FIG. 4 depicts an alternative embodiment of the present invention. In that embodiment, the float 10 of the preferred invention includes an extension attached to the upper end of float 10. The extension is attached by use of a resilient tube 30 which is fitted over the upper end of center stem 12. The extension unit itself also has a center stem 32 to which vanes 34 are attached. The vanes 34 provide a larger profile for increased visibility while offering all of the advantages of the construction of the float 10 as described above.

As described with respect to resilient tube 20 at the bottom of float 10, resilient tube 30 at the upper end of float 10 is also preferably a silicone tube. Also as above, the tube could alternatively be constructed of any suitably resilient material or a resilient coil spring. The primary concern is that the extension be resiliently attached. In the alternative, where resilient attachment is not necessary, the tube 30 could rigidly attach the extension to the upper end of float 10.

It will also be understood that center stem 32 could be used alone by, i.e., without vanes 34. That particular embodiment is particularly useful for ice fishing. The advantages for ice fishing include the fact that the preferred resilient tube 30 allows extension 32 to bend relative to center stem 12 which prevents breakage of the float system when being retrieved from an ice fishing hole which may have a diameter smaller than the overall length of the float system.

Figure 5:
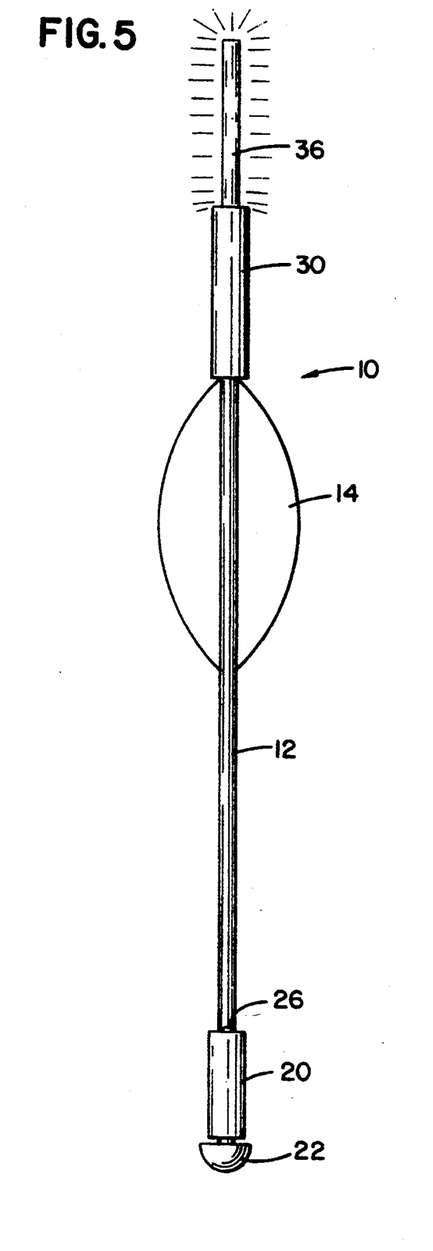
FIG. 5 is a side view of an alternate embodiment of the present invention.

FIG. 5 depicts yet another alternative embodiment of the present invention in which the float 10 has a luminescent light stick 36 attached to the upper end of center stem 12 via tube 30. The light stick 36 is readily available from a variety of sources at a low cost. It operates preferably via a chemical luminescent process in which, once activated, provides a relatively long lasting light source which is particularly useful when the present invention is used as a night float.

Figure 7:
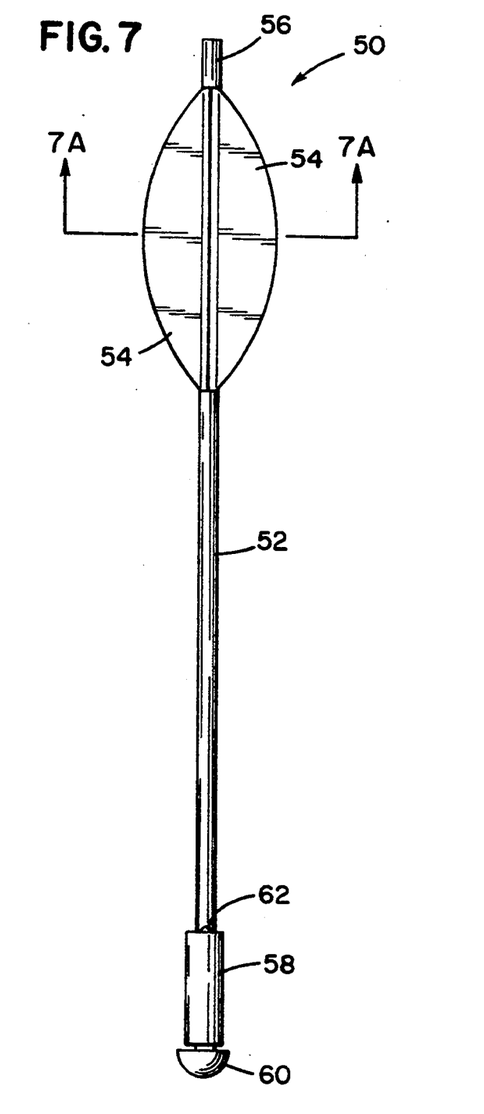
FIG. 7 is a side view of an alternate embodiment of the present invention.
Figure 7A:
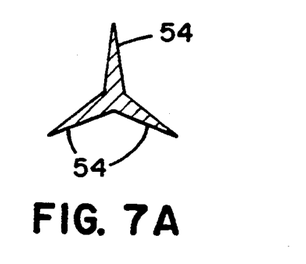
FIG. 7A is a cross-sectional view of the alternate embodiment of the present invention depicted in FIG. 7 along line A—A.

FIG. 7 depicts yet another alternative embodiment of the present invention. In that embodiment, the float 50 includes a plurality of vanes 54 molded as a one-piece unitary structure, as opposed to the vanes attached to a center stem as described with respect to FIG. 1. A cross section of the float section is depicted in FIG. 7A along lines AA in FIG. 7. Other features of this float 50 are similar to those of the preferred embodiment of the float 10. In particular, an upper center stem 56 is used to allow the attachment of additional accessories such as light sticks and extensions for added visibility. Center stem 52 protrudes from the bottom of the float section and includes line retention means having a similar structure to those previously described.

Figure 8:
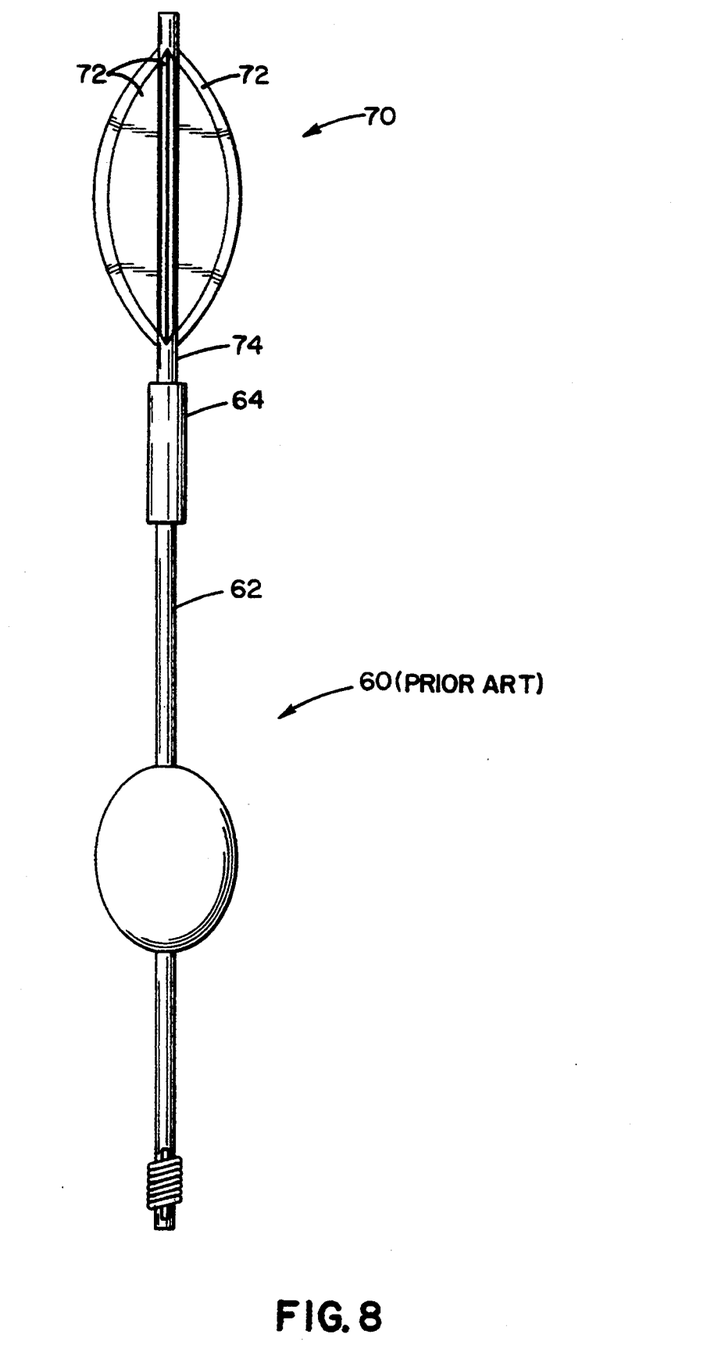
FIG. 8 is a side view of an alternative embodiment of the present invention attached to a known pencil bobber.

Turning to FIG. 8, the present invention can also be used to adapt a known pencil bobber 60. In this system, the extension 70 is fitted to the top protrusion 62 of the pencil bobber via sleeve 64. Extension 70 preferably includes three or more vanes 72 attached to center stem 74. The vanes 72 provide in increased profile to the pencil bobber without significantly affecting its operation during fishing. Sleeve 64 is preferably comprised of a silicone tube, although it will be understood that other materials or designs, such as coil springs could also be used.

Sleeve 64 can also be used to attach a chemical luminescent light stick to the top end of the pencil bobber 60 or, alternatively, the top end of the extension 70.

In addition, it will be understood that sleeve 64, center stem 74 and vanes 72 could be molded in a one-piece unitary structure. The extension 70 may also be molded of a non-buoyant material, contrary to the other embodiments described above.

Figure 9:
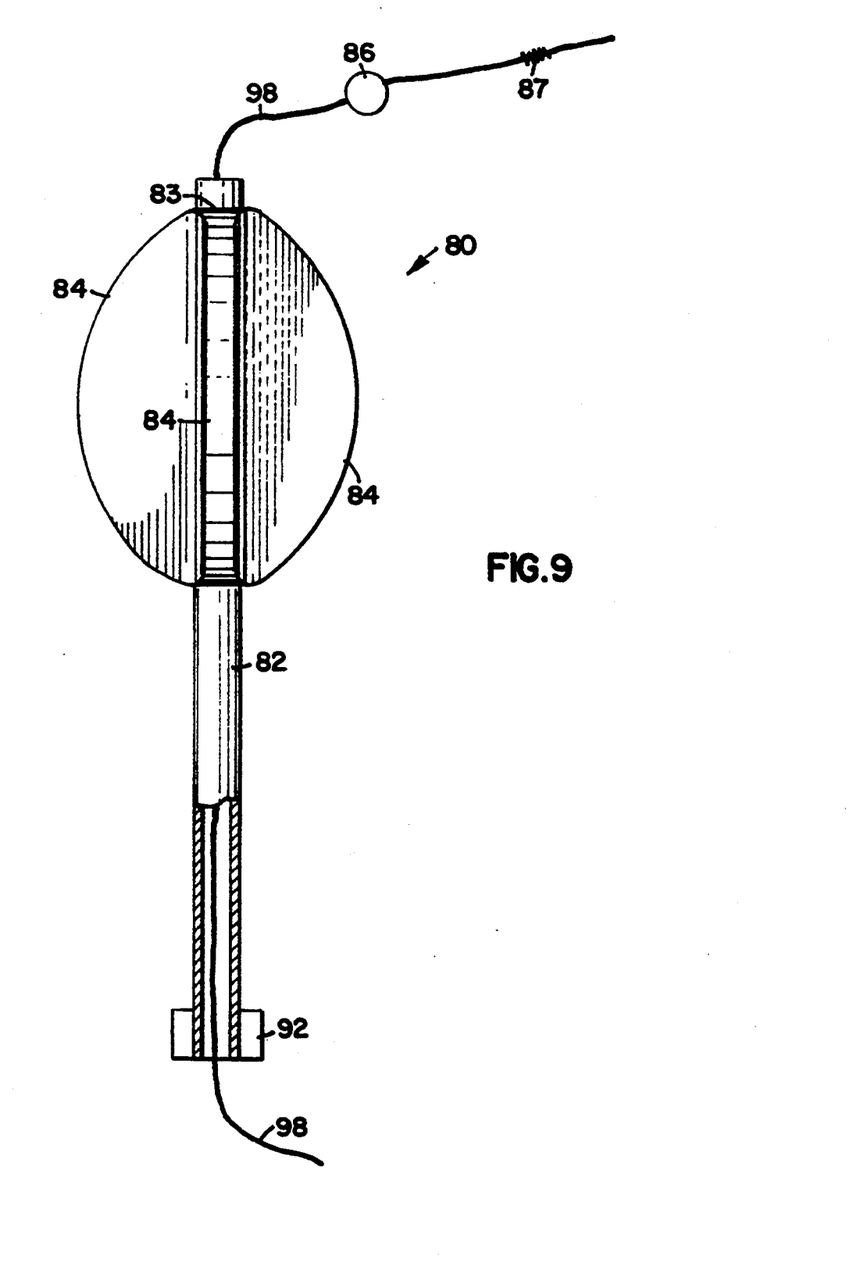
FIG. 9 is a partial cross-sectional view of an alternate embodiment of the present invention.

FIG. 9 depicts yet another embodiment of a fishing float manufactured according to the present invention. The float 80 includes a center stem 82 which preferably is formed of a hollow tube. The tube can be of plastic or any other suitable material. A float section 83 including vanes 84 is attached to center stem 82 and is preferably formed of a buoyant material such a closed cell urethane foam. Float section 83 including vanes 84 is preferably molded in a single piece with an opening running through the center of the float section 83 to receive the center stem 82. The float section 83 is then held on center stem 82 by friction or it can be attached more permanently using adhesives or other methods of attachment.

The vanes 84 of float section 83 are also preferably molded with a highly visible color to assist monitoring of the float 80 in the water. When molded with the preferred foam material, the color is in the material itself, thereby eliminating the chance for its removal as the float 80 is used and accumulates scratches, etc.

At one end of center stem 82, preferably distal from the vanes 84, a weight 92 is attached to provide castability to the float 80, as well as ensure that float 80 sits upright in the water when in use. The weight 92 is preferably formed of lead, although it will be understood that other materials are also contemplated. The weight 92 is preferably firmly and fixedly attached to center stem 82.

The location of the weight 92 and the length of center stem 82 can vary and can affect the casting performance of the float 80. In the preferred floats, a distance of about 1.5 to 4.0 inches appears to offer the best performance, although the optimum distance can vary based on materials used to construct the float 80, weather conditions, weight below the float 80 (from the bait or other weights attached to the line), etc.

The hollow nature of center stem 82 allows the fishing line 98 to be threaded through center stem 82. To do so, weight 92 is preferably provided as a collar around center stem 82 to allow the line 98 to pass therethrough.

When rigged in its most preferred version, the float 80 would be provided with a bead 86 and slip knot 87 located above the float 80 (towards the fishing pole). Bead 86 slides freely along line 98, but will not slide past slip knot 87. As a result, bead 86 prevents the float 80 from rising above bead 86. Live or artificial bait (not shown) is then attached to line 98 below the end of float 80. Additional weight (not shown) can also be attached to line 98 below float 80, if desired.

The floats of the present invention can be constructed of many different materials with the primary factors used to select materials being buoyancy, resistance to waterlogging, and adaptability to high speed manufacturing. As presently considered, the preferred embodiment will comprise a molded float having high visibility or painted to have such. Other contemplated materials include balsa wood vanes and wooden stems coated with a high visibility, water-proof finish, a molded styrofoam float coated with a high visibility, water-proof finish, or the molded urethane float described above.

It is preferred that the float section and/or vanes be formed of a buoyant material which can either be rigid or flexible. It is also preferred that the positive buoyancy of the float be provided substantially by the material in the vanes. As a result, the center stem is preferably made of material that has either neutral or negative buoyancy. It is also contemplated that the center stem could provide some small measure of positive buoyancy to the float, but that in all cases, the majority of the positive buoyancy be provided by the material in the vanes. In the preferred embodiment, all of the positive buoyancy is provided by the float section and/or vanes, with the center stem being at most neutrally buoyant and negatively buoyant with the addition of any weight to provide improved casting characteristics.

Alternatively, it will be understood that the buoyancy of the floats can be provided by material in the center stems, with the vanes provided only for their visibility and casting advantages.

The foregoing descriptions of the preferred and alternate embodiments of the present invention have been presented for the purposes of illustration and description. They are not intended to be exhaustive or to limit the invention to the precise embodiments disclosed. Many modifications and variations are possible in light of the above teachings. It is intended that the scope of the invention be limited not by this detailed description, but rather by the attached claims.

I claim:

1. A float device for fishing comprising:
   a) a first section including a center stem having first and second ends and a longitudinal axis lying between said first and second ends;
   b) line retention means, coupled to said first section, for holding a fishing line; and
   c) a float section attached to said center stem, said float section having three or more fixed vanes extending radially therefrom and extending substantially along a portion of the longitudinal axis of said center stem, said vanes having positive buoyancy in water sufficient to impart positive buoyancy in water to said float device.

2. The device of claim 1, wherein said vanes are spaced equally around said float section.

3. The device of claim 2, wherein said float section is selectively attachable to or detachable from said center stem.

4. The device of claim 1, wherein said line retention means further comprises a hollow bore formed through said center stem, said line being threaded through said hollow bore.

5. The device of claim 1, further comprising a weight attached to said device proximate said second end of said center stem.

6. The device of claim 1, further comprising accessory attachment means attached to said first end of said center stem, said accessory attachment means for attaching an accessory to said device.

7. The device of claim 6, wherein said accessory attachment means comprises a sleeve fitted over said first end, said sleeve having an opening for receiving an accessory.

8. The device of claim 6, wherein said accessory further comprises a luminescent device.

9. The device of claim 6, wherein said accessory further comprises a raised visibility extension.

10. The device of claim 9, wherein said raised visibility extension further comprises a plurality of vanes extending radially from said raised visibility extension.

11. The float device of claim 1, wherein said vanes have a greater buoyancy than said first section, thereby maintaining said center stem in a substantially vertical orientation in water.

12. A float device for fishing comprising:
   a) a first section including a center stem having first and second ends and a longitudinal axis lying between said first and second ends;
   b) line retention means, coupled to said first section, for holding a fishing line, said line retention means including:
      i) a slot formed proximate the second end of said center stem, said slot formed along the length of said center stem; and ii) retaining means fitted over said slot and said second end, said slot and retaining means cooperating to retain a fishing line within said slot; and c) a float section attached to said center stem, said float section having three or more vanes extending radially from a longitudinal axis of said float section, said vanes having positive buoyancy in water sufficient to impart positive buoyancy in water to said float device.

13. The device of claim 12, further comprising spacer means in said slot for retaining said slot in an open position against pressure from said retaining means tending to close said slot.

14. The device of claim 12, wherein said retaining means further comprises a sleeve fitted over said slot.

15. The device of claim 14, wherein said sleeve is formed of silicone tubing.

16. A float device for fishing comprising:
a) a first section including a center stem having first and second ends and a longitudinal axis lying between said first and second ends;
b) line retention means, coupled to said first section, for holding a fishing line; and
c) a float section attached to said center stem, said float section having three or more vanes extending radially from a longitudinal axis of said float section, said vanes having positive buoyancy in water sufficient to impart positive buoyancy in water to said float device, wherein said float section is a completely integral unitary section.

17. The device of claim 16, wherein said float section is constructed of a flexible closed cell foam material.

18. A float device for fishing comprising:
a) a first section including a center stem having first and second ends and a longitudinal axis lying between said first and second ends;
b) line retention means, coupled to said first section, for holding a fishing line;
c) a weight attached to said first section proximate said second end of said center stem; and
d) a float section attached to said center stem proximate said first end of said center stem, said float section having three or more vanes extending radially from a longitudinal axis of said float section, said vanes having positive buoyancy in water sufficient to impart positive buoyancy in water to said float device.

* * * * *